(12) United States Patent
Gulkis (10) Patent No.: US 7,712,110 B2
(45) Date of Patent: May 4, 2010

(54) SYSTEM AND METHOD FOR REMOTING TWAIN FUNCTION CALLS FROM A USER SESSION TO A CLIENT SYSTEM

(75) Inventor: Daniel Alec Gulkis, Pembroke Pines, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1000 days.

(21) Appl. No.: 10/711,612

(22) Filed: Sep. 28, 2004

(65) Prior Publication Data
US 2006/0070090 A1   Mar. 30, 2006

(51) Int. Cl.
G06F 3/00 (2006.01)
G06F 3/12 (2006.01)
(52) U.S. Cl. ...................................... 719/328; 358/1.1
(58) Field of Classification Search ................ 719/328, 719/310, 330; 370/307; 382/323; 358/1.1
See application file for complete search history.

(56) References Cited

U.S. PATENT DOCUMENTS

| | | | | |
|---|---|---|---|---|
| 5,267,051 A * | 11/1993 | Dellert et al. | ............... | 382/234 |
| 5,911,044 A * | 6/1999 | Lo et al. | ..................... | 709/203 |
| 6,141,696 A | 10/2000 | Goertzel et al. | | |
| 6,654,784 B1 * | 11/2003 | Wei | .............................. | 709/203 |
| 6,775,692 B1 | 8/2004 | Albert et al. | | |
| 6,894,981 B1 | 5/2005 | Coile et al. | | |
| 6,983,415 B2 * | 1/2006 | Shima | ........................ | 715/200 |
| 7,095,905 B1 * | 8/2006 | Peterson | ..................... | 382/284 |
| 7,126,955 B2 | 10/2006 | Nabhan et al. | | |
| 7,142,333 B2 * | 11/2006 | Struble | ........................ | 358/402 |
| 7,319,537 B2 * | 1/2008 | Kikuchi et al. | ............. | 358/1.15 |
| 7,496,234 B2 * | 2/2009 | Li | .............................. | 382/232 |
| 2003/0014368 A1 * | 1/2003 | Leurig et al. | .................. | 705/64 |
| 2004/0100651 A1 * | 5/2004 | Leone et al. | ............... | 358/1.15 |
| 2004/0146053 A1 | 7/2004 | Nabhan et al. | | |
| 2005/0025150 A1 | 2/2005 | Helmy et al. | | |
| 2008/0189434 A1 * | 8/2008 | Seki et al. | ..................... | 709/240 |

FOREIGN PATENT DOCUMENTS

EP    1198122 A    4/2002
WO    WO 98/58478 A    12/1998

OTHER PUBLICATIONS

Written Opinion on PCT/US2005/020345 by ISA, Oct. 14, 2005.
International Search Report related to PCT/US2005/020345.

* cited by examiner

*Primary Examiner*—Lechi Truong
(74) *Attorney, Agent, or Firm*—Choate, Hall & Stewart, LLP (57) ABSTRACT

A mechanism for remoting Twain function calls within a user session to a client system is disclosed. By hooking Twain function calls made by a Twain application on the server, the Twain function calls may be remoted over a virtual connection to a client system. A proxy application corresponding to the server-based Twain application is created on the client system. The proxy application communicates with the server and makes the appropriate function calls to the remainder of the Twain framework. The use of the proxy application allows multiple applications and devices to be supported simultaneously. Messages sent over the virtual connection are filtered prior to transmission thereby limiting the amount of required communication traffic. A multiplexor and demultiplexor are utilized in order to efficiently use bandwidth on the virtual channel. The present invention additionally compresses image data prior to transmission over the virtual channel.

24 Claims, 9 Drawing Sheets

SYSTEM AND METHOD FOR REMOTING TWAIN FUNCTION CALLS FROM A USER SESSION TO A CLIENT SYSTEM

FIELD OF THE INVENTION

The illustrative embodiment of the present invention relates generally to image data processing, and more particularly to the remoting of applications from a user session being hosted on a server to a client system in communication with a Twain-compliant image acquisition device.

BACKGROUND OF THE INVENTION

Twain is a standard framework for imaging applications. The applications call a well-known API to control document scanners, digital cameras, and image databases that are Twain-compliant. Vendor-supplied hardware drivers used with Twain devices conform to a well-known set of interfaces and capabilities. The standard framework for the Twain architecture includes a Twain application such as WORD from Microsoft Corporation of Redmond, Wash. or a photo editing application. The architecture also includes a data source manager (DSM) which is a component which supplies the API called by the application which controls the vendor-supplied hardware drivers. For the WINDOWS operating system from Microsoft Corporation of Redmond, Wash., the data source manager is found in the DLL twain_32.dll which is shipped with WINDOWS. The component is generic and has no knowledge of the underlying image hardware. Also included in the standard Twain architecture is a data source (DS) which is a vendor-supplied driver for a specific device. The data source is responsible for talking to the image acquisition device using one of several protocols such as USB, FIREWIRE, Parallel, SCSI, IR, BLUETOOTH, the IEEE 1394 protocol, the Wi-Fi protocol, or other wireless protocol. The imaging devices may be scanners, digital cameras, or software applications.

Figure 1:
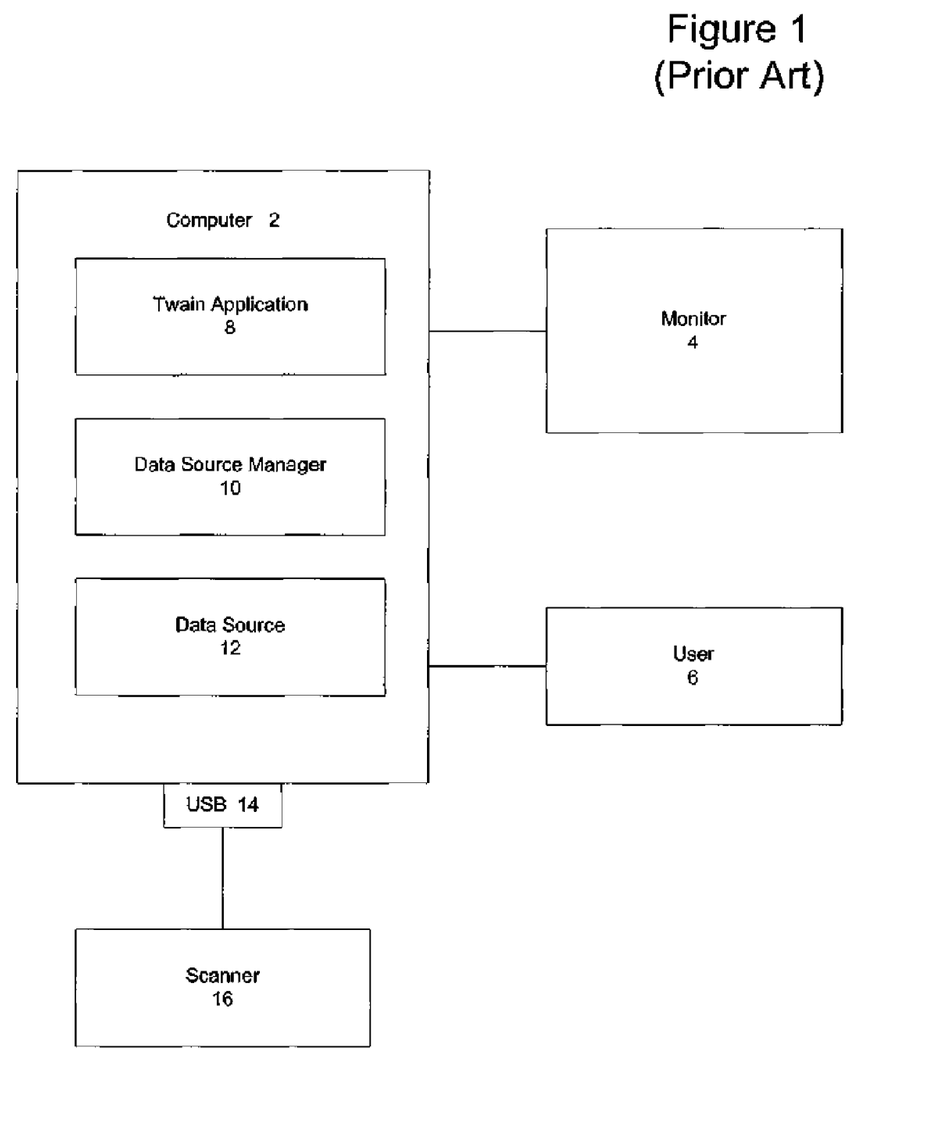
FIG. 1 (prior art) depicts a block diagram of a conventional Twain architecture.

FIG. 1 (prior art) depicts the conventional Twain architecture. The conventional Twain architecture includes a computer 2 that is being utilized by a user 6 with a connected monitor 4. The computer 2 includes a Twain application 8 such as a photo editing application. The Twain application 8 makes function calls to the data source manager 10. The data source manager 10 provides the API by which the application may access the vendor data source 12, the vendor-supplied hardware driver for the make and model of the image acquisition device communicating with the computer 2. The depicted Twain architecture includes a USB 14 interface to the computer. A Twain-compliant scanner 16 is tethered to the computer system via the USB interface 14.

Unfortunately, the conventional techniques for controlling Twain-compliant devices utilized by the Twain applications do not work particularly well in a distributed multi-user, multi-session environment. For example, a server hosting multiple user sessions for remote client systems must be loaded with unique vendor-specific hardware drivers for each Twain-compliant device. While not a problem for controlling a single device for a single user, multiple devices require the server to include multiple drivers. Additionally, for a server supporting user sessions, the virtual channel supports one application per session. This prevents multiple Twain-compliant devices from being supported within the same session and prevents the use of more than one Twain application in the session at the same time.

BRIEF SUMMARY OF THE INVENTION

The illustrative embodiment of the present invention provides a mechanism for remoting Twain function calls within a user session to a client system. By hooking Twain function calls made by a Twain application on the server, the Twain function calls may be remoted over a virtual connection to a client system. A proxy application corresponding to the server-based Twain application is created on the client system. The proxy application communicates with the server and makes the appropriate function calls to the remainder of the Twain framework. The use of the proxy application allows multiple applications and devices to be supported simultaneously. Messages sent over the virtual connection are filtered prior to transmission thereby limiting the amount of required communication traffic. A multiplexor and demultiplexor are utilized in order to efficiently use bandwidth on the virtual channel. The present invention additionally compresses image data prior to transmission over the virtual channel.

In one embodiment, a method for controlling acquisition devices associated with a client includes the step of providing a client that is communicating with a server using a presentation level protocol. The client is executing a proxy application associated with an application executing on a server. The method further includes the step of receiving at the proxy application a command directed to an image acquisition device that is associated with a client from a server via a network using a presentation level protocol. The method further includes the step of issuing the received command to the image acquisition device. The method additionally includes the steps of receiving a response to the issued command from the image acquisition device, and then transmitting the received response to the server via a network using a presentation level protocol.

In another embodiment, a method for remotely controlling an image acquisition apparatus associated with a client in a Twain client environment includes the step of receiving an image acquisition event from a client via a network. The method further includes the step of providing the received event to an application program which is associated with the event. The method further includes the steps of receiving the response to the transmitted event from the application program and then transmitting the received response to the client via the network.

In an embodiment, a method for controlling image acquisition devices communicating with a client includes the step of receiving a command from a server directed to an image acquisition device communicating with a client. The method also includes the steps of issuing a TWAIN API call based on the received command to the image-acquisition device communicating with the client and receiving, from the image-acquisition device, a response to the issued command. The method also transmits to the server the received response.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

The illustrative embodiment of the present invention allows a user session to support multiple Twain-compliant devices communicating with a client system and/or multiple Twain applications executing in the user session. By hooking Twain function calls from the Twain applications executing in the user session, the function calls may be redirected using a presentation level protocol to a proxy application on the client system for handling. The proxy application is created on the client system and corresponds to each application executing in the user session on the server. Messages on the client system 40 are filtered so as to transmit only essential communications to the server.

Figure 2A:
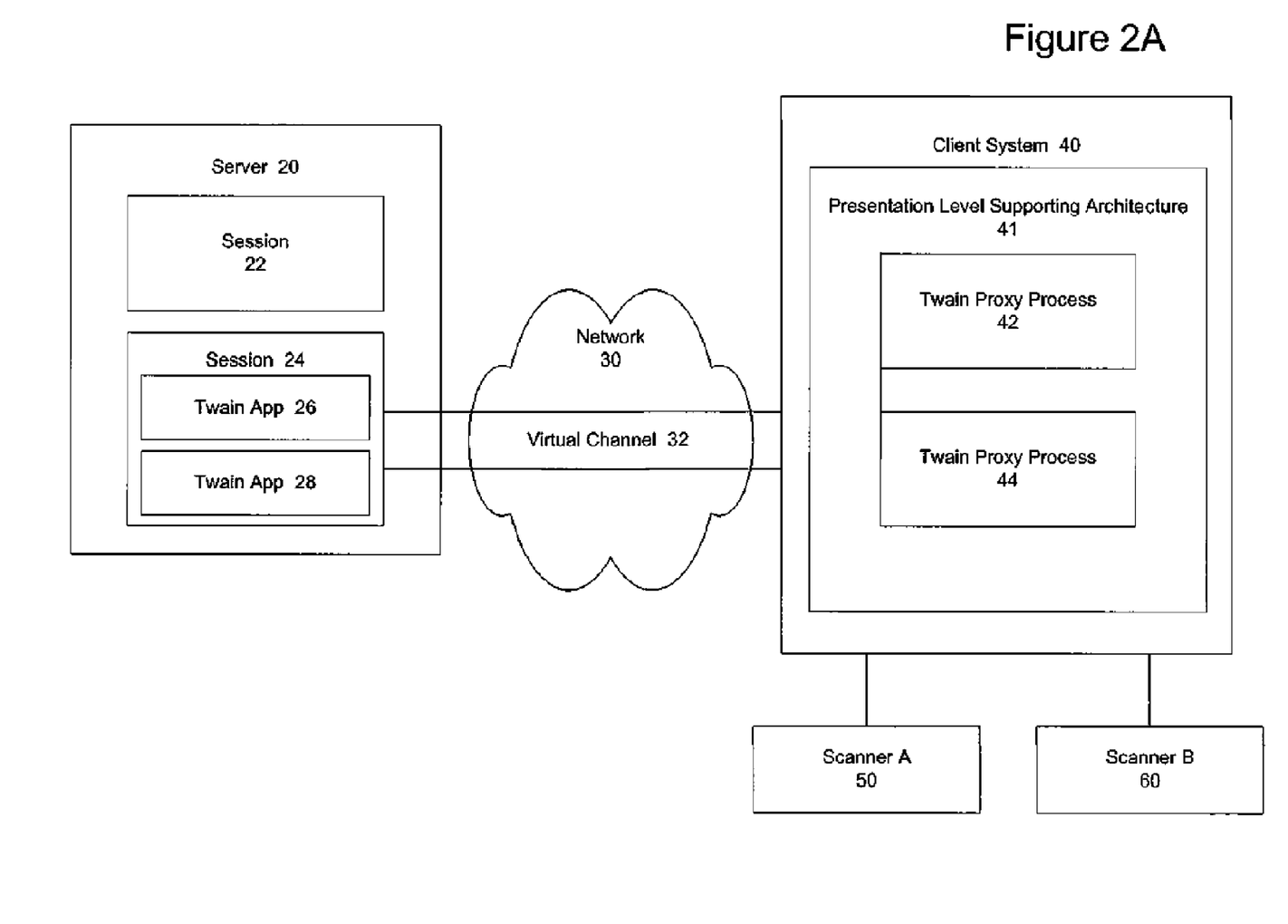
FIG. 2A depicts an environment suitable for practicing the illustrative embodiment of the present invention.

FIG. 2A depicts an environment suitable for practicing an embodiment of the present invention. The server 20 is connected over a network 30 to a client system 40. The server 20 hosts one or more user sessions 22 and 24. The user sessions may include executing instances of Twain compliant applications 26 and 28. Twain function calls from the Twain applications 26 and 28 are transmitted over virtual channel 32 created by a presentation level protocol to corresponding Twain proxy processes 42 and 44 on the client system 40. Scanner A 50 and Scanner B 60 are in communication with the client system 40 and are controlled by the commands originated from applications 26 and 28 executing in the user session 24 on the server 20 and processed at the client system. The mechanics of the communication between the server 20 and client system 40 are explored in greater detail in FIG. 2B below.

Figure 2B:
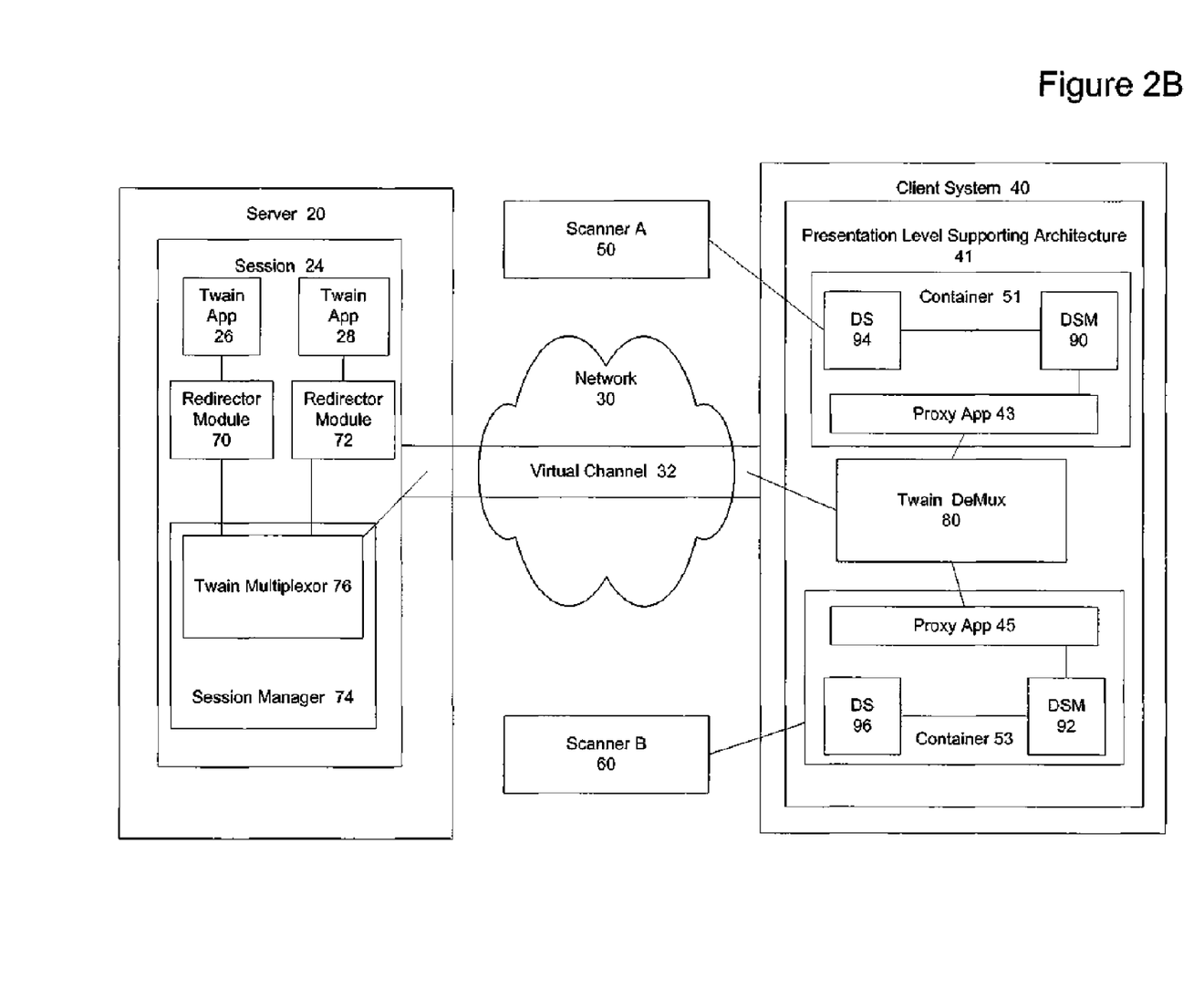
FIG. 2B depicts the environment of FIG. 2A in greater detail.

FIG. 2B depicts the environment of FIG. 2A in greater detail. Server 20 hosts a user session 24. The user session 24 includes Twain applications 26 and 28 in contact with redirector modules 70 and 72, respectively. The redirector modules 70 and 72 are a server side hook DLL that hooks the entry point into the twain_32.dll (the entry point into the DSM). The redirector modules 70 and 72 intercept all Twain calls from the Twain applications 26 and 28 and forwards the calls to the client system 40. The redirector modules 70 and 72 also uncompress images that were requested to be compressed using JPEG compression. The redirector modules 70 and 72 are in contact with a Twain multiplexor 76 hosted by a session manager 74. In an ICA architecture, the session manager 74 is the WFShell Process.

The Twain multiplexor 76 is a server-side virtual channel module that runs in the session manager 74 and is used to manage Twain communications between the client and the server. The Twain multiplexor 76 receives payloads from the redirector module 70 and 72 associated with the Twain application executing in the session 24. The Twain multiplexor 76 splits the payloads into a sequence of smaller packets in compliance with size limitations for the virtual channel 32. The packets are then written to the virtual channel for transition to the client system. The Twain multiplexor 76 passes requests down to the client system 40 and returns responses received from the client. The Twain multiplexor 76 is not aware of whether the requests and responses match up and does not wait for responses. Accordingly, it may receive and forward several requests from different Twain applications 26 and 28 before it receives any responses. The Twain multiplexor 76 also assembles incoming packets into payloads which are then routed to the appropriate redirector module 70 and 72.

The virtual channel 32 transports the packets over the network 30 to the client system 40. The packets are sent to the virtual channel 32 in a strictly ordered sequence. A Twain demultiplexor (demux) 80 receives the packets on the client system over the virtual channel 32. The Twain demultiplexor 80 is a client-side virtual channel driver that plugs into the presentation level protocol supporting architecture 41 on the client system (e.g.: the demux plugs into the ICA client). The Twain demultiplexor 80 receives Twain requests as a strictly ordered sequence of packets. It assembles the incoming packets into payloads. Error checking may be performed during receipt of the incoming packets. When a payload is completely received the Twain demultiplexor 80 forwards the payload to a proxy application 43 and 45. The correct proxy application 43 and 45 is identified by examining a field in the payload. The Twain demux 80 on the client system maintains a listing of registered proxy applications 43 and 45. If the proxy application 43 and 45 is a new proxy application and therefore not registered, the Twain demux 80 creates the proxy application.

The proxy applications 43 and 45 are hosted by a container process 51 and 53 on the client system 40 and correspond to Twain applications 26 and 28 on the server. The proxy applications 43 and 45 process the commands received from the Twain demultiplexor 80 and originated by the Twain applications 26 and 28 after registering with the Twain demultiplexor. The proxy applications 43 and 45 make an API call to the DSM 90 and 92 in order to control the vendor-specific drivers 94 and 96 for the scanners 50 and 60 that are communicating with the client system 40. Because the proxy application 43 and 45 executes as a container process, it provides the context in which to run dynamic linked libraries without corresponding security issues. The proxy applications also receive messages generated by the data source 94 and 96.

When the data source UI 94 and 96 is enabled (e.g.: the scanning dialog box), the proxy application 43 and 45 simulates the original Twain application by processing every message that is received. For example, in a WINDOWS environment, the proxy application would invoke the MSG_PROCESSEVENT command for every WINDOWS message that is received, such as a message indicating that a button had been pressed on an image acquisition device. If the message is not owned by TWAIN, the application for which the message is intended processes the message normally. However, if the message is a TWAIN notification, a notification payload is sent to the Twain demux 80 from where it is forwarded to a redirector module 70 and 72 on the server 20 and then onto the Twain application 26 and 28. The Twain application 26 and 28 may then issue a new command in response to the notification, in which case the Twain command is transmitted to the client system.

The initial screening of messages on the client side lessens network traffic as only messages that may be Twain notifications are forwarded over the virtual channel. Network traffic may also be lessened by the compression of bitmaps into JPGs prior to transmission. Image data acquired by the image acquisition device communicating with the client system 40 may be compressed based on pre-determined rules prior to transmission to the server 20. For example, image data that has a ratio of 1 bit per pixel location may be sent without compression while image data that has two or more bits per pixel location may be compressed prior to transmission. Similarly, the image data may be compressed with more than one compression algorithm with the output of the algorithm that is smallest in size being transmitted to the server. Compression is done in the proxy application 43 and 45 and decompression is done in the Twain Redirector module 70 and 72.

Those skilled in the art will recognize that the components in the server 20 and client system 40 that are used to create a session on the server which the user can access via the client system will vary depending upon the architecture deployed. Exemplary presentation level supporting architectures include the Independent Computing Architecture (ICA) from Citrix Systems Inc. of Fort Lauderdale, Fla., the Remote Desktop Protocol (RDP) from Microsoft Corporation of Redmond, Wash. and the X-Window Protocol from the X-Open Consortium. In the ICA architecture for example, the client-side Presentation Level Protocol Supporting Architecture 41 is an ICA client, and the server 20 deploys a METAFRAME PRESENTATION SERVER to create and maintain the server-hosted user sessions. Similar components from the RDP architecture, X-Open architecture or other presentation level protocol supporting architecture may also be deployed within the scope of the present invention.

Figure 3A:
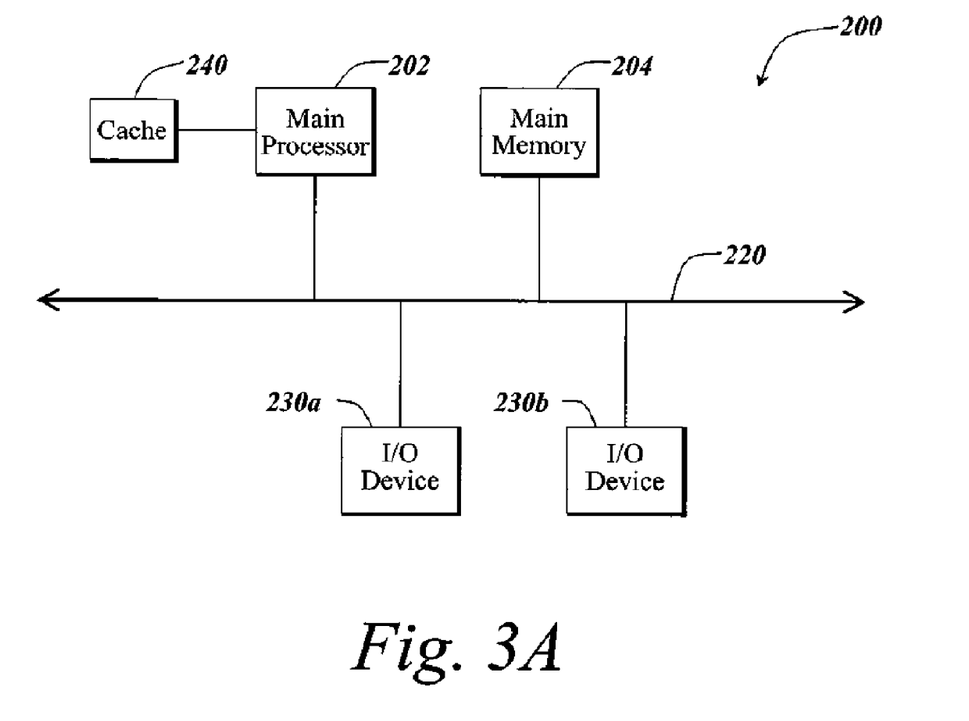
FIG. 3A and FIG. 3B are block diagrams depicting embodiments of the computers useful in connection with the present invention.
Figure 3B:
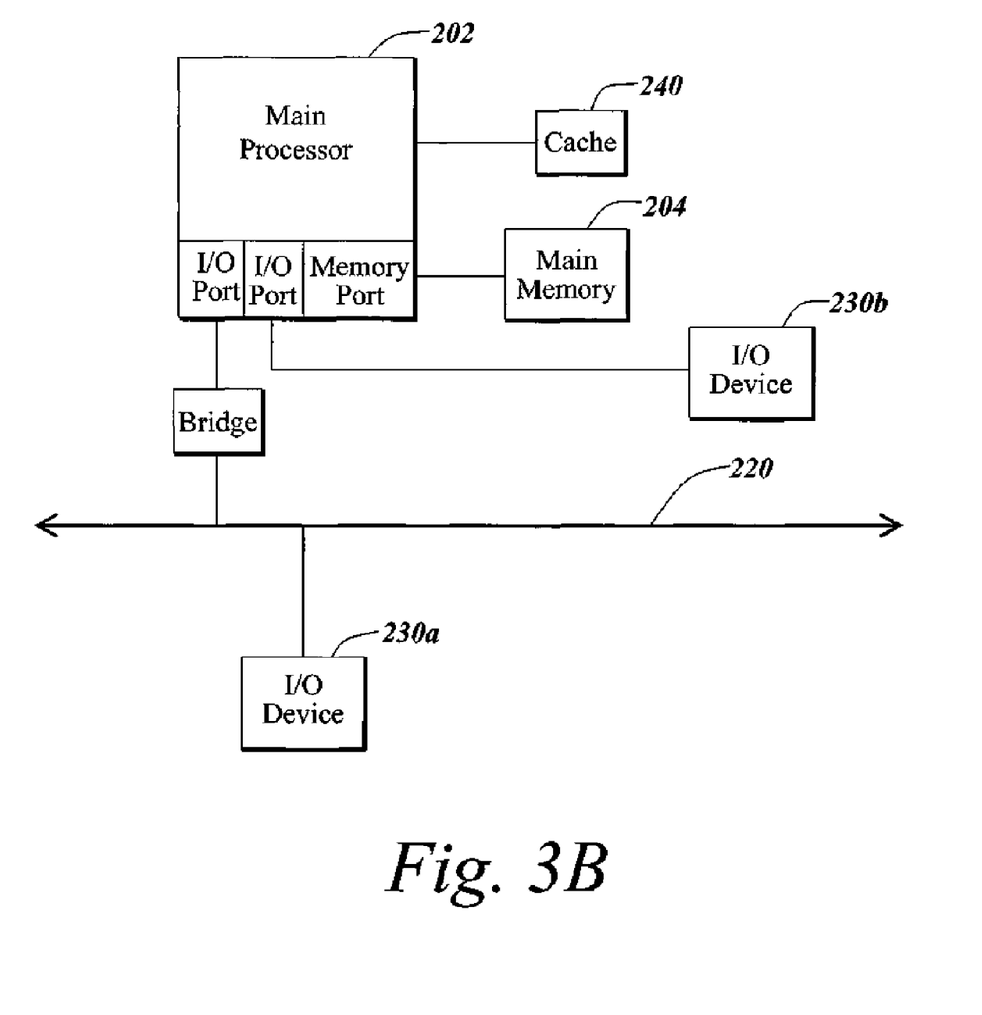

In many embodiments, the client system 40 and server 20 are provided as personal computer or computer servers, of the sort manufactured by the Hewlett-Packard Corporation of Palo Alto, Calif. or the Dell Corporation of Round Rock, Tex. FIGS. 3A and 3B depict block diagrams of a typical computer 200 useful as the client system 20 and server 40. As shown in FIGS. 3A and 3B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athalon 64 FX, the AMD Athalon, or the AMD Duron processor, manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 00 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 3A, the processor 202 communicates with main memory 204 via a system bus 220 (described in more detail below). FIG. 3B depicts an embodiment of a computer system 200 in which the processor communicates directly with main memory 204 via a memory port. For example, in FIG. 3B the main memory 204 may be DRDRAM.

FIGS. 3A and 3B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 3A, the processor 202 communicates with various I/O devices 230 via a local system bus 220. Various buses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 3B depicts an embodiment of a computer system 200 in which the main processor 202 communicates directly with I/O device 230b via HyperTransport, Rapid I/O, or InfiniBand. FIG. 3B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIGS. 3A and 3B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments in which the device in communication with the client system 24 is a mobile device, the client device may be a JAVA-enabled cellular telephone, such as the i50sx, i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the device 24 in communication with the client system is mobile, it may be a personal digital assistant (PDA) operating under control of the PalmOS operating system, such as the Tungsten W, the VII, the VIIx, the i705, all of which are manufactured by palmOne, Inc. of Milpitas, California. In further embodiments, the device 24 in communication with the client system 4 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif., the ViewSonic V36, manufactured by ViewSonic of Walnut, California, or the Toshiba PocketPC e405, manufactured by Toshiba America, Inc. of New York, N.Y. In still other embodiments the device in communication with the client system 24 is a combination PDA/telephone device such as the Treo 180, Treo 270 or Treo 600, all of which are manufactured by palmOne, Inc. of Milpitas, Calif. In still a further embodiment, the device in communication with the client system 24 is a cellular telephone that operates under control of the PocketPC operating system, such as the MPx200, manufactured by Motorola Corp.

Figure 4A:
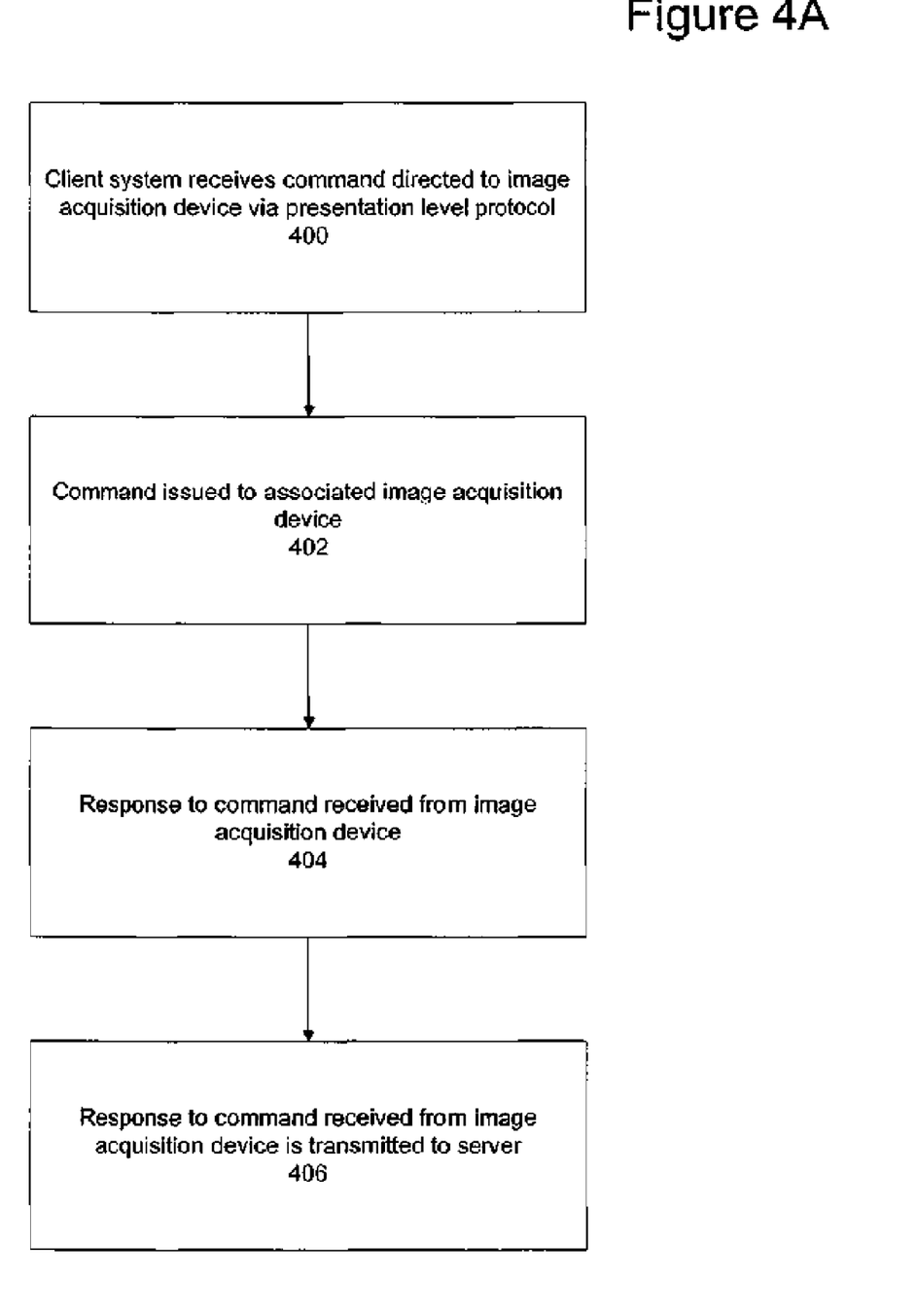
FIG. 4A is a flowchart of the sequence of steps followed by a client system in an embodiment of the present invention to process commands directed to an image acquisition device.

FIG. 4A is a flowchart of the sequence of steps followed by a client system in an embodiment of the present invention to process commands directed to an image acquisition device. The sequence begins when the client system 40 receives a command directed to an image acquisition device sent using a presentation level protocol (step 400). The command is received on the client system by the twain proxy application and forwarded to the image acquisition device (step 402). The command may result in a Twain API call based on the received command. The command also may require a device driver call based on the received command. Alternatively, the command may be issued directly to the image acquisition device/process. Similarly, the received command may require the issuance of another command to the image acquisition device, such as an indication to suppress the display of a dialog box being shown to a user and/or the displaying of a second dialog box in lieu of the suppressed dialog box. Subsequently, the response to the command is received from the image acquisition device (step 404) and transmitted to the server hosting the twain application (step 406). The response received from the image acquisition device may be data representing an image.

The illustrative embodiment of the present invention also provides security for a client system. Commands sent from the Twain application in the user session to the image acquisition device may be required to receive an affirmative user response prior to execution. For example, the situation where commands are being sent to an image acquisition device tethered to a client system which is not displaying a UI can be dealt with by requiring a pop-up dialog to indicate at the client system that a command is being sent to the image acquisition device. The configuration of the redirector module so that the actual command is sent only following an affirmative response from a user at the client system prevents "stealth" operation of the image acquisition device by the application executing in the session.

Although the above sequence of steps focuses on the receipt of a single command from a single server, those skilled in the art will recognize that alternative sequences of steps may occur within the scope of the present invention. For example, a second command may also be received from a second server using a presentation level protocol that is directed to the image acquisition device associated with the client. Alternatively, the server may issue a second command directed to a second image acquisition device associated with the client. Similarly, a second image acquisition device associated with the client system may receive a command from a second server using the presentation level protocol.

Figure 4B:
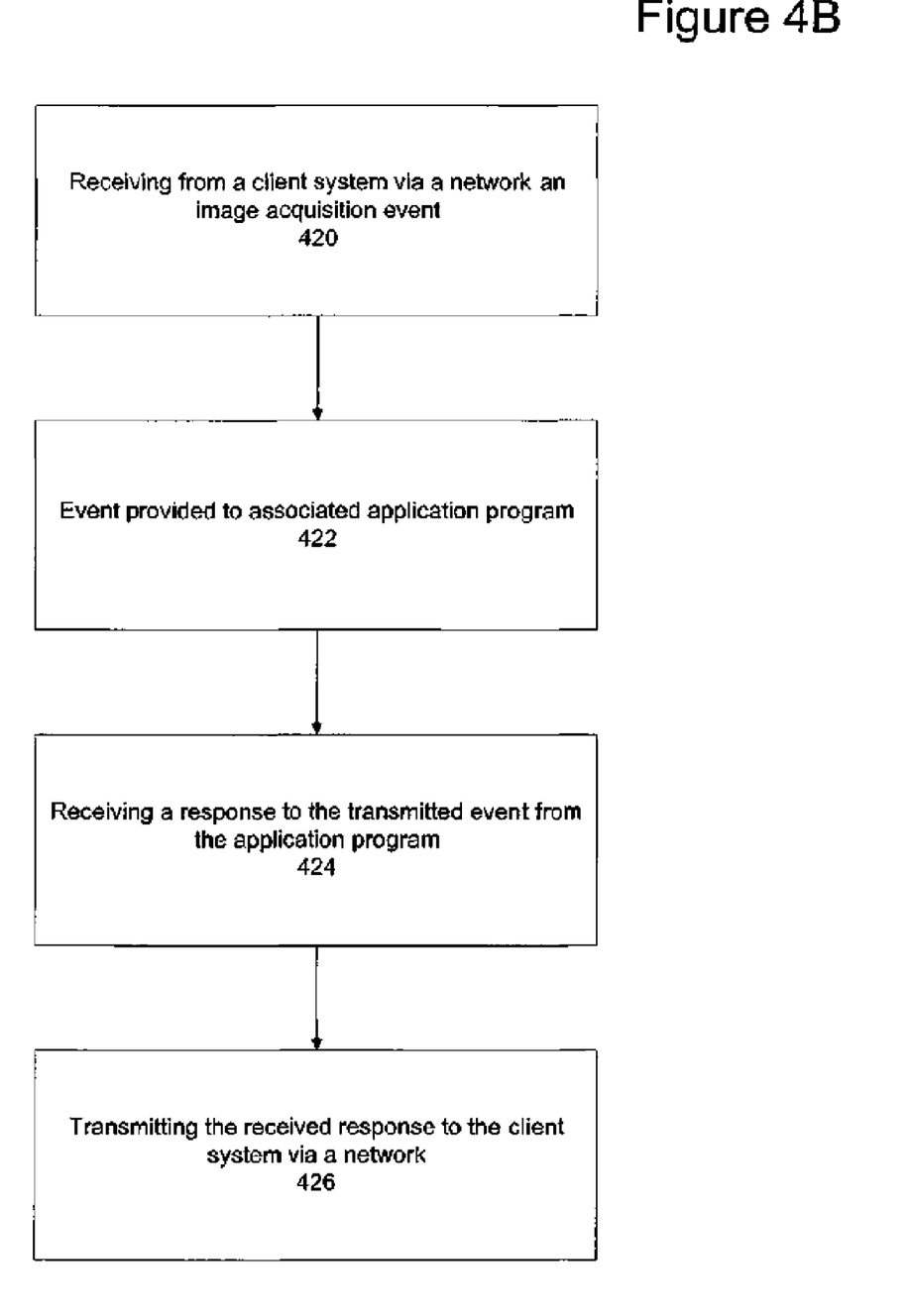
FIG. 4B is a flowchart of the sequence of steps followed by a server system in an embodiment of the present invention to process an image acquisition event.

FIG. 4B is a flowchart of the sequence of steps followed by a server system in an embodiment of the present invention to process an image acquisition event. The sequence begins when the server receives an image acquisition event over a network from a client system (step 420). For example, a button being pushed on a scanner generates an event. The image acquisition device event is provided to an associated Twain application program 26 and 28 on the server 20 (step 422). The application program generates a response to the transmitted event (step 424) and transmits the received response to the client system via a network.

It should also be noted that although many of the embodiments of the present invention discussed herein have been discussed with reference to a Twain application executing within a user session with the rest of the Twain framework residing on the client system, other implementations are also possible. For example, the Twain application may be executing on a server but not in a user session with the remainder of the Twain framework (the DSM and DS) operating on a client system. Communications between the two may be carried out without the use of a presentation level protocol. Similarly, although the description contained herein has discussed remoting the DSM and DS portions of the Twain framework to the client system while hosting the Twain application in a user-session on the server, other implementations are possible within the scope of the present invention. For example, the DSM could also be located at the server while the DS was remoted to the client system. In such a case, the calls to the DS from the DSM would be intercepted at the server and sent to the client system.

Figure 5A:
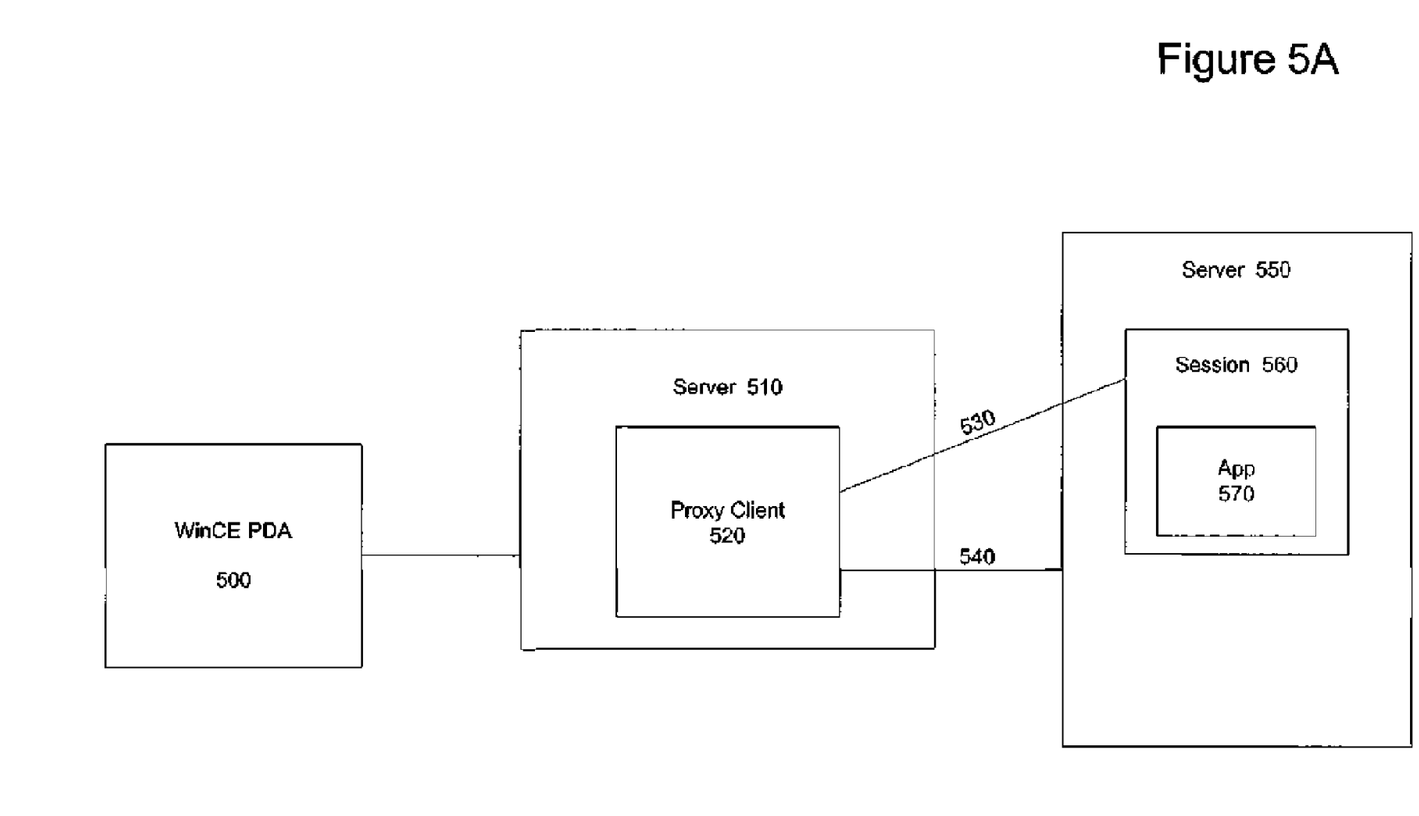
FIG. 5A is a block diagram of an embodiment of the present invention depicting the use of a proxy client in a pass-through environment.

In addition to the previously depicted client-server architecture, the illustrative embodiments of the present invention allow for a "pass-through" architecture where the image acquisition device in communication with the client system is a client or thin client accessing a proxy client on a server over a network. For example FIG. 5A depicts a WinCE enabled PDA 500 hosting a Twain imaging device accessing a proxy client 520 executing on a server 510. The proxy client 510 may be an ICA client which establishes a control virtual channel 530 and communication virtual 540 with server 550. Server 550 includes a session 560 with an instance of application 570 executing within the session. The WinCE PDA 500 may be mapped into the second server 550 consistent with the mechanisms outlined above.

Figure 5B:
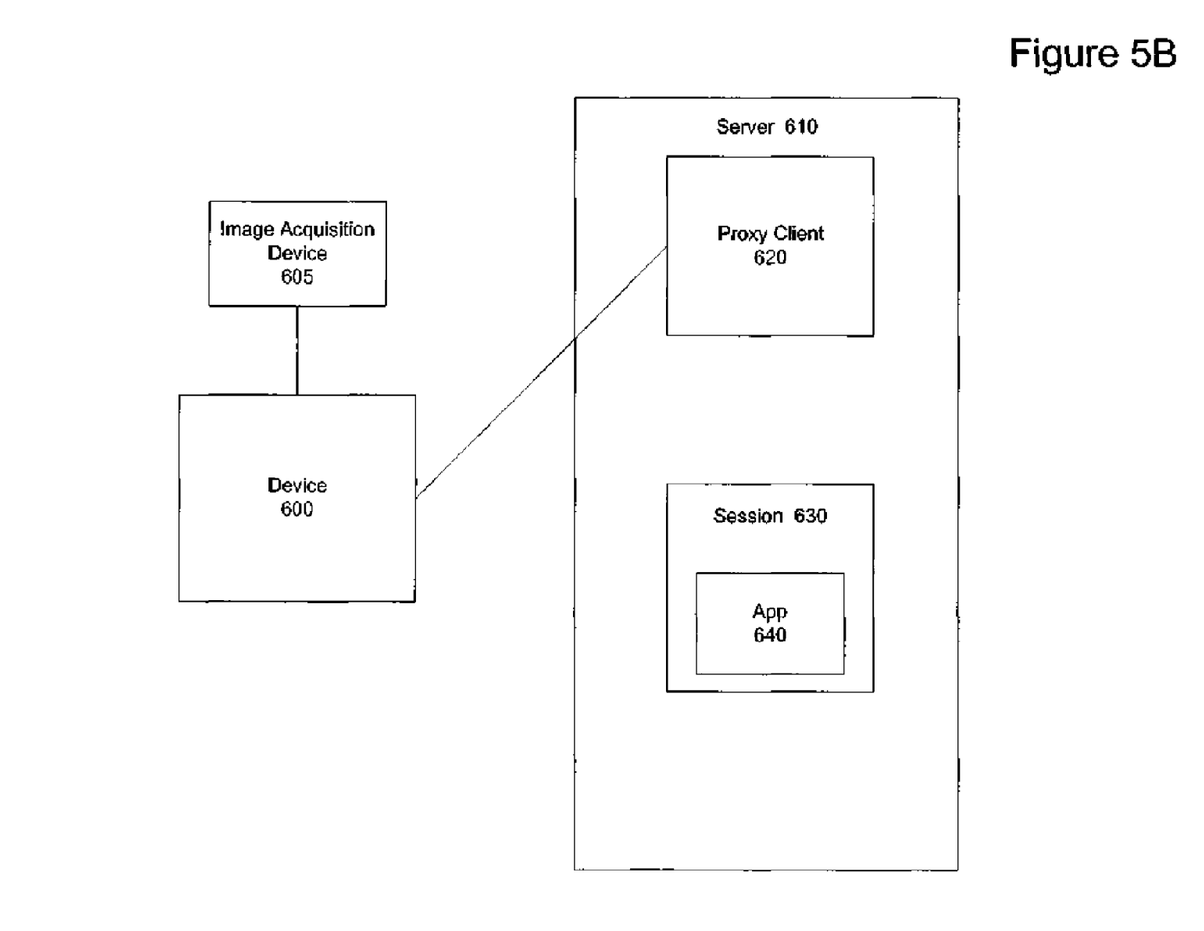
FIG. 5B is a block diagram of another embodiment of the present invention depicting the use of a proxy client in a pass-through environment where the proxy client is located on the server hosting the user session.

Similarly, FIG. 5B shows an alternative architecture where both the proxy client and user session are supported by the same server. In FIG. 5B, an image acquisition device 605 is in communication with a client device 600. The client device 600 is in communication with server 610. Server 610 includes both a proxy client 620 and user session 630. User session 630 includes an instance of executing application 640. The image acquisition device 605 may be mapped into the user session 630 on server 610 via the proxy client 620. Those skilled in the art will recognize that additional implementations and alternative architectures are also possible within the scope of the present invention.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed as new and desired to be protected by Letters Patent of the United States is:

1. A method for controlling image acquisition devices associated with a client, the method comprising:
    selecting, by a demultiplexor executing on a client, a TWAIN proxy application from a plurality of TWAIN proxy applications executing on the client communicating with a server via a presentation layer protocol, the selected TWAIN proxy application associated with a TWAIN application executing on the server;
    receiving by said TWAIN proxy application, from the server, over a network using the presentation-layer protocol, a command directed to an image-acquisition device associated with the client;
    issuing, by the TWAIN proxy application, a TWAIN Application Programming Interface (API) call to the associated image acquisition device, based on the received command;
    receiving, from the image-acquisition device, an acquired image in a response to the issued TWAIN API call; and
    transmitting, by the client, to the server, over the network, using the presentation layer protocol, the received response.

2. The method of claim 1 wherein receiving a command directed to an image-acquisition device further comprises receiving the command sent by the server over the network using a presentation layer protocol selected from the group consisting of ICA, RDP and XWINDOWS.

3. The method of claim 1 wherein issuing the TWAIN API call further comprises issuing to the image-acquisition device a device driver call based on the received command.

4. The method of claim 1 wherein issuing the TWAIN API call further comprises directly issuing to the image-acquisition device a TWAIN API call based on the received command.

5. The method of claim 1 wherein issuing the TWAIN API call further comprises issuing to the associated image-acquisition device a TWAIN API call based on the received command, the issued command including an indication to suppress display of a dialog box to a user.

6. The method of claim 5 further comprising displaying a second dialog box to a user in lieu of the suppressed dialog box.

7. The method of claim 1 further comprising receiving, from a second server via the network, a second command directed to the image-acquisition device associated with the client.

8. The method of claim 1 further comprising receiving, from the server via the network, a second command directed to a second image-acquisition device associated with the client.

9. The method of claim 1 further comprising receiving, from a second server via the network, a second command directed to a second image-acquisition device associated with the client.

10. The method of claim 1 wherein receiving the response to the issued TWAIN API call further comprises receiving, from the image-acquisition device, data representing an image.

11. The method of claim 10 wherein transmitting to the server further comprises transmitting to the server compressed image data.

12. The method of claim 11 wherein transmitting to the server further comprises determining that the image data includes more than one bit for each pixel location prior to transmitting the compressed image data to the server.

13. The method of claim 12 wherein determining further comprises:
    compressing the image data using a first compression algorithm to form first compressed image data;
    compressing the image data using a second compression algorithm to form second compressed image data; and
    selecting for transmission the smaller of the first compressed image data and the second compressed image data.

14. The method of claim 11 further comprising compressing compressed image data during transmission to the server.

15. The method of claim 1 further comprising:
    receiving, prior to receiving a response to the issued TWAIN API call, input from a user of the client; and
    determining, prior to receiving a response to the issued TWAIN API call, whether to transmit the received input to the server.

16. A method for remotely controlling an image acquisition apparatus associated with a client, the method comprising:
    receiving, by a server from a client associated with an image acquisition device, via a network using a presentation-layer protocol, an image acquisition event;
    providing, by a redirector module executing on the server, the received event to a TWAIN application program executing on the server and associated with the image acquisition event;
    receiving, by the server from the TWAIN application program, a response to the provided image acquisition event including a TWAIN Application Programming Interface (API) call;

transmitting, by the server via the network, the received response to the client executing a demultiplexor, the demultiplexor:
  selecting a TWAIN proxy application from a plurality of TWAIN proxy applications executing on the client, the selected TWAIN proxy application associated with the TWAIN application program, and
  forwarding the received response to the selected TWAIN proxy application; and
receiving, from the client via the network, data representing an image acquired by the image acquisition device apparatus associated with the client.

17. The method of claim 16 wherein providing the received event further comprises:
  determining, from the received image acquisition event, a TWAIN application program associated with the received event; and
  providing the received event to the determined TWAIN application program.

18. The method of claim 16 further comprising decompressing the received image acquisition data.

19. The method of claim 16 further comprising receiving an image acquisition event from a second client via the network.

20. The method of claim 19 further comprising providing the image acquisition event received from the second client to a second instance of a TWAIN application program associated with the image acquisition event.

21. A system for controlling image acquisition devices associated with a client system, the system comprising:
  a server computer comprising a processor executing a TWAIN application;
  a redirector module executing on the server and intercepting calls made by the TWAIN application;
  a multiplexor executing on the server computer and transmitting the calls to a client system communicating with the server computer over a network via a presentation layer protocol;
  a plurality of TWAIN proxy applications executing on the client system;
  an image-acquisition device associated with the client system; and
  a demultiplexor executing on the client system, the demultiplexor:
    receiving the transmitted calls,
    selecting at least one TWAIN proxy application from amongst the plurality of TWAIN proxy applications, the at least one TWAIN proxy application associated with the TWAIN application executing on the server, and
    forwarding the received calls to the at least one TWAIN proxy application, the received call including a TWAIN Application Programming Interface Call.

22. The system of claim 21, wherein the image-acquisition device generates image data responsive to receiving the calls.

23. The system of claim 22, wherein the client system transmits the image data to the server computer.

24. The system of claim 23, wherein the client system compresses the image data prior to transmission, and transmits the compressed data to the server computer.

* * * * *